July 30, 1929. N. S. FOX 1,722,663
SHIFTABLE SCREEN
Filed Nov. 24, 1928
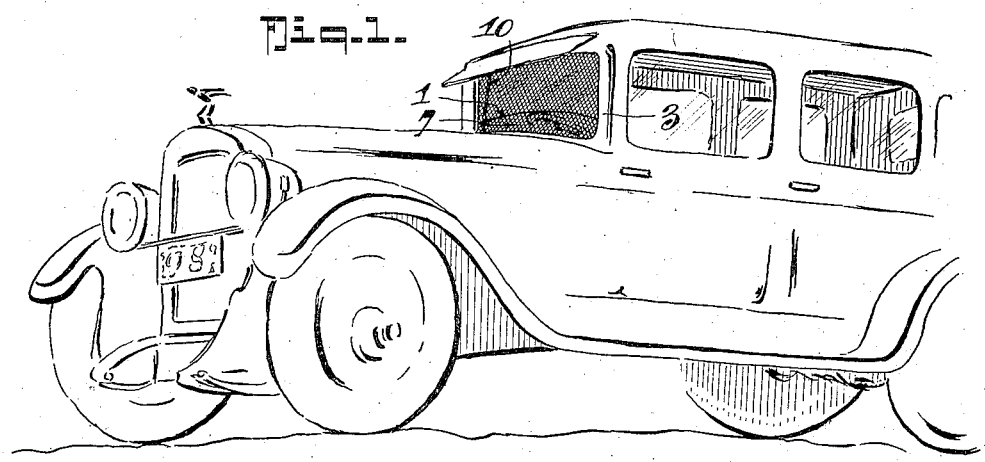
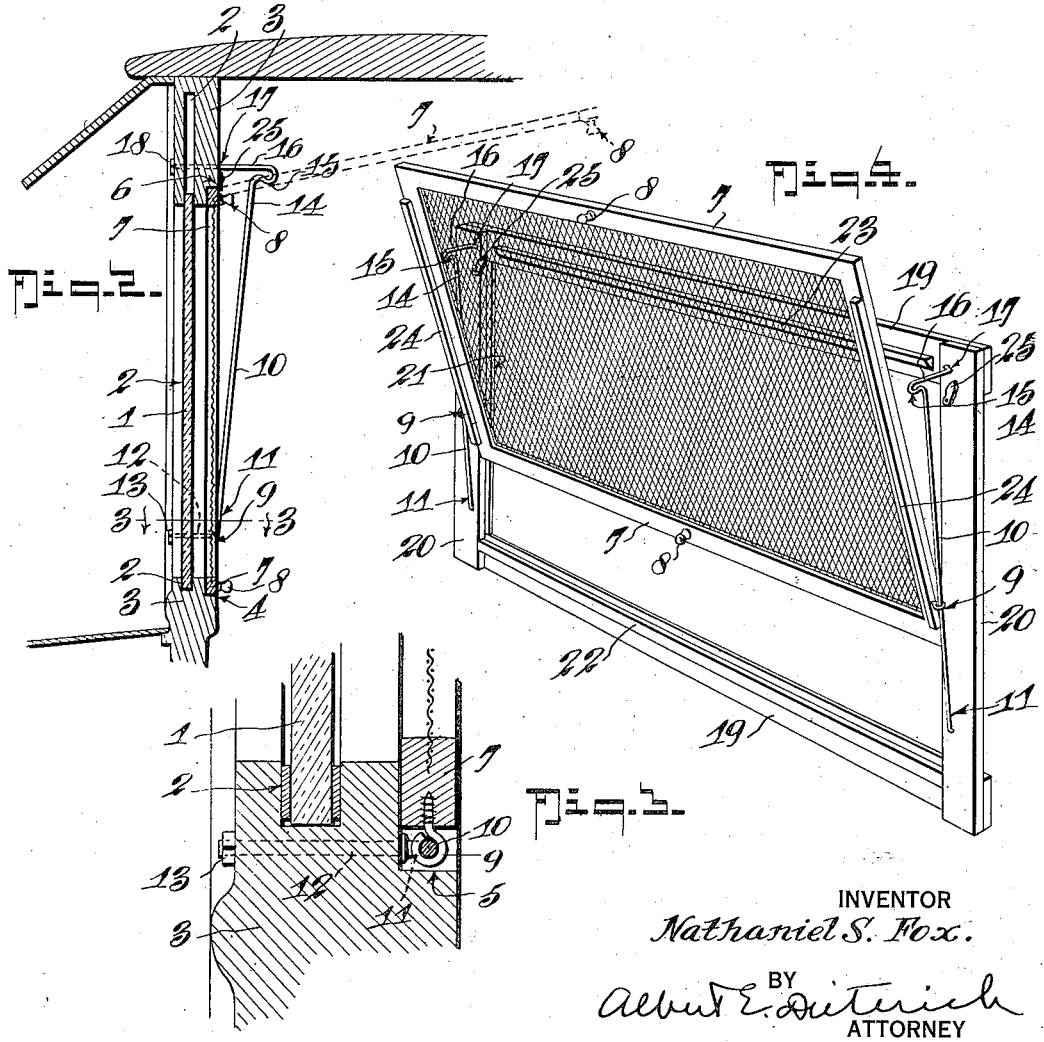
INVENTOR
Nathaniel S. Fox.
BY
Albert E. Dietrich
ATTORNEY Patented July 30, 1929.

1,722,663

UNITED STATES PATENT OFFICE.

NATHANIEL S. FOX, OF BRIDGETON, NEW JERSEY.

SHIFTABLE SCREEN.

Application filed November 24, 1928. Serial No. 321,719.

The invention primarily has for its object to provide a novel screen structure readily mountable in association with a structure opening such as an automobile window or windshield to protect the said opening against entrance of undesirable insects (honey-bees, wasps, hornets, etc.), and which is readily shiftable to an elevated out-of-the-way position whenever desired.

In its more detailed nature the invention resides in the provision of a novel shiftable screen structure comprising a screen frame to normally close the opening but which is shiftable to an elevated out-of-the-way position above the opening when its use is no longer desired, novel mounting brackets and stop devices being provided whereby the screen frame is suitably supported in either of the positions stated.

Other objects will in part be obvious and in part be pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawing, in which:—

Figure 1 is a perspective view illustrating the invention in use in association with an automobile windshield.

Figure 2 is a vertical cross section illustrating the invention mounted as shown in Figure 1.

Figure 3 is a detail horizontal section taken on the line 3—3 on Figure 2.

Figure 4 is a perspective view illustrating the screen frame as mounted on an open rectangular supporting frame.

In the drawing I have disclosed the invention as mounted in association with the windshield of an automobile. The invention is particularly adapted to such use but it is also readily adaptable for use in connection with the window and door openings of an automobile or in association with any other such opening. The invention is likewise adapted for use in connection with various types of automobile windshield and while I have disclosed its association with a windshield of the vertical slidable type it is to be understood that the invention comprehends uses with other types of windshields.

In the drawing 1 generally designates the windshield glass which is vertically slidable in the grooveways 2 provided therefor in the front wall of the vehicle indicated at 3. The inner face of the wall is shaped to provide a screen-receiving recess defined by the lower sill 4, the side or lateral shoulders 5 and the top rest shoulder or stop 6.

A rectangular screen frame 7 fits within the recess defined by the shoulders 4, 5 and 6 and a hand knob 8 is secured to the upper cross rail of the frame as illustrated in Figure 2 of the drawing for a purpose later to be described.

A screw eye or mounting ring 9 projects laterally from each side rail of the screen frame 7 and surrounds a rod bracket 10 so that the screen frame is vertically-slidably mounted on the said brackets through the medium of the said eyes. As will be observed by reference to Figure 2 of the drawing the main body of each rod bracket 10 bears angular relation to the opposed face of the front wall 3, the lower end of the said bracket substantially merging with or being closely adjacent the inner face of the wall 3 at a point a considerable distance above the sill 4 or the lower cross strip of the screen frame. This restrictive association of the lower bracket end with the wall 3 is indicated at 11 and at this point the rod bracket is turned horizontally as at 12 so that it may be conveniently secured to the wall 3 or other support in any suitable manner as indicated at 13.

The upper end of each rod bracket is thus spaced a considerable distance away from the inner face of the wall 3 as indicated at 14, and the said upper end of each bracket is bent away from the wall and in a manner for providing a dip or eye-receiving depression 15 and is then turned back over itself horizontally as at 16 to provide for convenient mounting of the upper end of the bracket. An abutment shoulder 17 is formed in the portion 16 and the upper end of each bracket may be secured to the wall 3 or other support in any suitable manner such as indicated at 18. When mounted as shown in the drawing the shoulder 17 will form an abutment to facilitate the securing of the bracket.

When the parts are constructed and mounted as shown in Figures 1 to 3 of the drawing the restricted portion 11 of the bracket, being spaced a considerable distance above the sill 4, will serve to hold the eye 9 close to the wall 3 and by reason of engagement of the lower rail of the screen frame 7 with the receiving recess at the sill 4, the screen frame will be securely held to the position illustrated in full lines in Figure 2.

When it is no longer desired that the windshield opening should be protected by the screen it is possible for the operator of the vehicle to pull inwardly on the knob 8 to withdraw the upper edge of the screen frame out of the receiving recess. Then by an upward and outward pull on the said frame, the outwardly inclined relation of the main body portion of the rod bracket 10 permitting such movement, the screen frame may be moved from the position illustrated in full lines in Figure 2 to that illustrated in dotted lines in the said figure when the lower edge of the screen frame will engage under the stop strip or shoulder 6 and the eyes 9 carried by the frame and rest in the depressions 15 of the brackets to securely hold the screen to the elevated out-of-the-way position.

In Figure 4 of the drawing I have illustrated a screen frame mounted on an open rectangular mounting bracket which may itself be secured in any approved manner in association with any opening for which screen protection is desired. In this illustration of the invention the open rectangular frame comprises top and bottom cross rails 19 and side rails which join to form the said frame. Abutment ledges 21 are provided at each side and a sill strip 22 is provided at the bottom, a stop strip 23 being provided at the top to cooperate with the depressions 15 of the rod bracket in securely holding the screen frame in its elevated out-of-the-way position. In this form the screen frame 7 may be equipped with side runners 24 which may serve to carry the mounting eyes 9.

If desired hinged cleats 25 may be employed adjacent the top of the screen to hold the top of the screen against accidental jarring out of position.

It will also be noticed that by the use of my invention in the event of a shattering of the wind shield glass the screen will tend to protect the occupants of the vehicle from injury by broken glass.

From the foregoing description, taken in connection with the accompanying drawing, it is thought that the novel details of construction, the manner of use and the advantages of my invention will be readily apparent to those skilled in the art to which it relates.

What I claim is:

1. A screen structure comprising an open rectangular frame having a stop strip, bracket rods carried by the frame, a screen frame carried by the open frame and having mounting eyes projecting therefrom a distance above its lower edge and surrounding the bracket rods, and said bracket rods being secured close to the frame at their lower ends at points spaced upwardly relatively to the screen frame lower edge whereby to hold the screen frame flat against the open frame when in the lowered position, and said bracket rods having eye-receiving depressions formed in their upper ends and spaced relatively to the stop strip whereby to hold the screen frame substantially horizontally when raised away from the open frame with its lower end supported under the stop strip and the mounting eyes resting in the receiving depressions.

2. A screen structure comprising an open rectangular frame having a stop strip, bracket rods carried by the frame, a screen frame carried by the open frame and having mounting eyes projecting therefrom a distance above its lower edge and surrounding the bracket rods, and said bracket rods being secured close to the frame at their lower ends at points spaced upwardly relatively to the screen frame lower edge whereby to hold the screen frame flat against the open frame when in the lowered position, and said bracket rods having eye-receiving depressions formed in their upper ends and spaced a considerable distance away from the face of the open frame and relatively to the stop strip whereby to hold the screen frame substantially horizontally when raised away from the open frame with its lower end supported under the stop strip and the mounting eyes resting in the receiving depressions.

3. A shiftable screen structure for automobile openings comprising a screen frame, a mounting eye projecting laterally from the frame at each side a distance above the bottom, a bracket rod rigidly mounted on a fixed support at each side of and adjacent the frame, one of the frame eyes slidably surrounding each bracket rod, each said bracket rod being positioned closely adjacent its support at its lower end and spaced a distance from its support at its upper end and provided with an eye-receiving depression, and a stop strip positioned corelatively to the receiving depressions for the purpose described.

4. In a structure wherein is provided an opening to be screen protected and having edges defining the opening; a screen frame adapted to lie flat against the opening defining edges and over the opening when in its operative position and to be elevated and shifted to a substantially horizontal position above the opening when in its inoperative position, means to support the frame in both positions, said means comprising mounting eyes projecting from the screen frame, and rod brackets carried by the opening defining side edges and on which the mounting eyes are slidably connected, said rod brackets being positioned closely adjacent the said side edges at the lower portions of the brackets and spaced a considerable distance from the side edges at the upper portions of the brackets and provided with eye-receiving depressions, and a stop strip positioned corelatively to the said depressions for the purposes specified.

NATHANIEL S. FOX.